United States Patent [19]

Tomoshige

[11] 4,039,560
[45] Aug. 2, 1977

[54] METHOD OF PRODUCING MODIFIED POLYETHYLENE WAX

[75] Inventor: Toru Tomoshige, Ohtake, Japan

[73] Assignee: Mitsui Petrochemical Industries, Ltd., Tokyo, Japan

[21] Appl. No.: 280,760

[22] Filed: Aug. 15, 1972

[30] Foreign Application Priority Data

Aug. 20, 1971 Japan .................................. 46-62965

[51] Int. Cl.$^2$ .................. C07D 307/89; C07D 307/60
[52] U.S. Cl. ............................ 260/346.3; 260/346.74; 260/468 G; 260/485 N; 260/514 G; 260/533 N; 428/523; 526/53; 526/22; 526/56
[58] Field of Search ................... 260/78.4 D, 346.8 R, 260/346.3, 533 N, 485 N, 514 G, 468 G; 526/56, 22

[56] References Cited

U.S. PATENT DOCUMENTS

| | | | |
|---|---|---|---|
| 2,973,344 | 2/1961 | Fasce | 260/78.4 D |
| 3,403,175 | 9/1968 | Volgemuth | 260/533 |
| 3,414,551 | 12/1968 | Reid et al. | 260/78.4 D |
| 3,450,559 | 6/1969 | Schaufelberger | 428/268 |
| 3,450,560 | 6/1969 | Bacskai | 260/78.4 D |
| 3,590,076 | 6/1971 | Heintzelman et al. | 260/485 |
| 3,642,722 | 2/1972 | Knowles et al. | 260/78.4 D |
| 3,687,905 | 8/1972 | Dorer | 260/78.4 D |
| 3,892,717 | 7/1975 | Mori et al. | 260/78.4 D |

Primary Examiner—Henry R. Jiles
Assistant Examiner—Bernard Dentz
Attorney, Agent, or Firm—Sherman & Shalloway

[57] ABSTRACT

A method of producing a modified waxy ethylene polymer, which comprises polymerizing ethylene in an inert hydrocarbon solvent at 120° – 250° C. and pressure ranging from the vapor pressure of the solvent at the polymerization temperature to 100 Kg/cm$^2$ using a catalyst composed of a halogen compound of titanium and/or vanadium and an organoaluminum compound supported on a carrier comprising a hydrocarbon-insoluble magnesium-containing compound to form a waxy ethylene polymer having a viscosity average molecular weight of 500 to 30000, reacting an unsaturated polycarboxylic acid with the resulting waxy ethylene polymer in the presence of a peroxide at a temperature above the melting point of the waxy ethylene polymer and up to 250° C., and if desired, contacting the ethylene polymer, before or after the reaction with the unsaturated polycarboxylic acid, with oxygen or a gas containing oxygen.

7 Claims, No Drawings

METHOD OF PRODUCING MODIFIED POLYETHYLENE WAX

This invention relates to a method of producing modified polyethylene wax by reacting a polyethylene wax prepared by a specific method with an unsaturated polycarboxylic acid, to a method of producing an esterified wax by reacting the modified polyethylene wax with an alcohol, and also to a method of producing the modified polyethylene wax by oxidizing the wax before or after modification with the polycarboxylic acid.

Various methods of producing waxy ethylene polymers have been developed with an increase in demand for wax in recent years. These methods include, for example, a method of heat-decomposing high pressure polyethylene obtained by radical polymerization, and a method of obtaining a waxy ethylene polymer directly by polymerizing ethylene using a coordination catalyst consisting of a halogen compound of titanium or vanadium and an organoaluminum compound.

The present invention proposes an improved method of producing a waxy ethylene polymer directly using a Ziegler catalyst supported on a hydrocarbon-insoluble magnesium-containing compound.

The use of the waxy ethylene polymer normally is limited because of low compatibility with water and low affinity for other substances.

Accordingly, the object of this invention is to provide a method of producing a modified waxy ethylene polymer having improved affinity for other substances.

The above object of the invention is achieved by a method of producing a modified polyethylene wax, which comprises polymerizing ethylene in an inert hydrocarbon solvent in the presence of hydrogen and/or an alpha-olefin at 120 to 250° C. and a pressure ranging from the vapor pressure of the solvent at the polymerization temperature to 100 Kg/cm$^2$ to form a waxy ethylene polymer having an average molecular weight of 500 to 30,000, and reacting the resulting ethylene polymer with an unsaturated polycarboxylic acid at a temperature above the melting point of the waxy ethylene polymer up to 250° C. in the presence of a peroxide.

The modified waxy ethylene polymer obtained above may be esterified with alcohol.

The ethylene polymer may also be modified by contacting it with oxygen or a gas containing oxygen before or after the modification of the polymer with the polycarboxylic acid.

Preferably, the polyethylene wax to be modified with the unsaturated polycarboxylic acid has almost a constant molecular weight as a whole, and is of straight chain type. When polyethylene having a long chain obtained by radical polymerization (high pressure method) is used as a starting material, the molecular weight distribution of the resulting wax becomes too wide, so that a modified polyethylene wax of homogeneous quality cannot be obtained. In order to obtain a straight-chain polyethylene wax having a narrow distribution of molecular weight, it is proper to polymerize ethylene using a Ziegler-type catalyst composed of a transition metal compound and an organometallic compound. Polyethylene wax obtained by heat-degrading high-molecular-weight polyethylene, even if it is a straight-chain polyethylene wax, is not desirable because it has a large quantity of intramolecular double bonds, which makes it difficult to perform the reaction of forming a cross-linked product by graft polymerization in the presence of a peroxide, and also adversely affects the properties, especially thermal stability, of the product.

The polyethylene wax used in the method of this invention is produced by a method similar to that used for producing general thermoplastic polyethylene using a Ziegler-type polymerization catalyst. In the case of producing wax, hydrogen or an alpha-olefin is used in a larger quantity than in the polymerization of ethylene for general purposes, and ethylene is polymerized especially at high temperatures and pressures. By the amount of hydrogen and/or alphaolefin, the molecular weight and density of the resulting polyethylene wax are adjusted, and by performing the reaction at high temperatures and pressures, the quantity of the double-bond portion which becomes the cause of the formation of gel and a cross-linked structure, is reduced.

Furthermore, since the production of polyethylene wax is performed at high temperatures in the molten state, superhigh-molecular-weight polyethylene ascribable to nonuniform polymerization is not formed as a by-product, but a polyethylene wax of uniform quality having a narrow distribution of molecular weight can be obtained. This is desirable when it is made into a modified polyethylene wax. As the alpha-olefin to be present in the polymerization of ethylene, propylene, 1-butene, 1-hexene and 4-methyl-1-pentene, and other alpha-olefins having 3 to 12 carbon atoms are preferred.

The constituents of the polymerization catalyst for ethylene may be the same for those used in producing general-purpose polyethylene.

As the halogen compound of titanium, titanium tetrahalide, titanium trihalides, titanium alkoxytrihalides, titanium dialkoxydihalides, and titanium trialkoxymonohalides can usually be used. Specific examples are titanium tetrachloride, titanium tetrabromide, titanium trichlorides, titanium monoethoxytrichloride, titanium dibutoxydichloride, and titanium triisopropoxy chloride. Titanium tetrachloride, titanium monoethoxytrichloride, titanium diethoxydichloride, titanium monopropoxy trichloride, titanium diisopropoxydichloride, and titanium dibutoxydichloride are preferred. As the halogen compound of vanadium, vanadium tetrahalides, vanadium oxyhalides, and vanadyl trialkoxides can be cited as examples. Vanadium tetrachloride, vanadium oxychloride and vanadyl triethoxides are preferred.

Examples of the organoaluminum compounds are trialkyl aluminums, dialkyl aluminum halides, dialkyl aluminum alkoxides, alkylaluminum sesquihalides, and alkyl aluminum dihalides.

In order to produce a polyethylene wax of narrow molecular weight distribution in a high yield by polymerizing ethylene, there is used a catalyst composed of a catalyst component comprising a halogen compound of titanium and/or vanadium which is supported on the fine particles of a hydrocarbon-insoluble compound containing magnesium such as magnesium oxide, magnesium oxyhalide, magnesium carbonate, magnesium halide or magnesium aluminate. The supporting of the halogen compound of titanium and/or vanadium on the carrier is achieved, for example, by immersing the carrier in a liquid titanium or vanadium compound to react them with each other; by contacting the carrier with vaporous titanium and/or vanadium compound; or by pulverizing the carrier and a titanium or vanadium compound together. When ethylene is polymerized at high temperatures in the molten state by using such a carrier-supported catalyst to obtain polyethylene wax, especially when a magnesium compound is used as the carrier, the catalyst also acts as a hydrogenation catalyst. Therefore, polyethylene wax having a reduced amount of durable bonds in the main chain can be obtained. Cross-linking does not occur even in the presence of a peroxide, and the polyethylene wax obtained has good color.

A catalyst component of high activity may sometimes be obtained when the carrier is treated with a small amount of an organic polar substance prior to the supporting reaction, so as not to cause the loss of a solid phase. Preferably, the organic polar substance is a compound containing an electro-negative atom such as oxygen or nitrogen, such as alcohols, esters, carboxylic acids, ethers or amines. Specific examples are methanol, ethanol, ethyl acetate, butyl propionate, acetic acid, butyric acid, ethyl ether, tetrahydrofuran, pyridine, and dimethylaniline.

The preferred inert hydrocarbon solvents are, for example, pentane, hexane, heptane, iso-octane, cyclohexane and kerosene, all of which are inert to the Ziegler catalyst.

The polymerization temperature is 120° to 250° C., preferably 160° to 220° C.

It is necessary that the polymerization pressure should be above the vapor pressure of the solvent at the polymerization temperature. The pressure, therefore, differs according to the solvent used, and when hexane is used as the solvent, the polymerization pressure is usually from 30 to 60 Kg/cm$^2$G.

The polyethylene wax, after separation of the catalyst residue, may be reacted with an unsaturated polycarboxylic acid in the presence of a peroxide in the molten state.

The polyethylene wax to be modified by the method of this invention generally has an average molecular weight of 500 to 30,000, a density of 0.900 and 0.975 g/cm$^3$ and less than 0.6 intramolecular bond per 1000 carbon atoms.

The molecular weight is obtained by measuring the inherent viscosity of the wax as a decalin solution at 135° C. using an Ostwalt viscometer and substituting it for $M_v{}^- = 2.51 \times 10^4 [\eta]^{1.235}$.

Examples of the unsaturated polycarboxylic acid to be grafted to the polyethylene wax are maleic acid, fumaric acid, citraconic acid, itaconic acic, 5-bicyclo [2.2.1] heptene-2,3-dicarboxylic acid, anhydrides of these acids, or alkyl esters of these acids. The use of maleic anhydride is especially preferred.

The amount of the unsaturated polycarboxylic acid to be used is 0.1 to 20 parts by weight, preferably 1 to 15 parts by weight, per 100 parts by weight of the polyolefin. It is preferred that the reactants contain 0.1 to 15% by weight of oxygen.

The organic peroxide used in one embodiment of the present invention is preferably one which decomposes at a temperature below the melting point of the polyethylene wax, but is not limited thereto. Examples of the organic peroxide are dialkyl peroxides such as ditertiary butyl peroxide, tertiary butyl cumyl peroxide or dicumyl peroxide, diacyl peroxides such as acetyl peroxide, propionyl peroxide or benzoyl peroxide, and peroxy esters such as tertiary butyl peroxylaurate or tertiary butyl peroxybenzoate. Dicumyl peroxide and ditertiary butyl peroxide are preferred. The amount of the organic peroxide is 0.01 to 20 parts by weight, preferably 0.05 to 10 parts by weight, per 100 parts by weight of the polyethylene wax.

Generally, the graft polymerization of an unsaturated polycarboxylic acid is performed, for example, by charging polyethylene wax, the unsaturated polycarboxylic acid and a peroxide as a catalyst into a reactor equipped with an agitator or a kneader such as a Banbury mixer, Kokneader, extruder or Henschel mixer, and heat-melting the mixture at a temperature not lower than the decomposition temperature of the peroxide and to a temperature above the melting point of the polyethylene wax but no higher than 250° C. The presence of a solvent in the reaction system where the unsaturated polycarboxylic acid reacts is not essential, but for the control of the reaction temperature or the convenience of handling, a solvent inert to the reaction can be used. The preferred insert solvents are, for example, chlorobenzene, bromobenzene, dichlorobenzene, tetrachloroethane, trichloroethane and trichloroethylene.

The heat-melting time is usually 1 to 10 minutes. When an extruder is used as the heat-melting apparatus, the fabrication of the polymer can be performed at the same time as the graft-polymerization, the use of an extruder is advantageous.

It is not always necessary to charge all of the polyethylene wax, unsaturated polycarboxylic acid and the peroxide in amounts necessary for the final composition from the start of the mixing or kneading operation. It is also possible to charge a part of the required amounts at the outset, and after mixing, add the remainder for further mixing or the remainder may be added during kneading with an extruder.

The above operation appears to cause easy grafting of the unsaturated polycarboxylic acid to polyethylene wax. But when the presence of even a small amount of the free unsaturated polycarboxylic acid that is unreacted is not desired, the unreacted unsaturated polycarboxylic acid can be easily removed by a known method such as by heating the reaction product at reduced pressure or extracting it with a suitable solvent.

Generally, wax, especially polyethylene wax, has extremely poor compatibility with water. But since the polyethylene wax modified with the unsaturated polycarboxylic acid by the method of this invention has good affinity for water, it can be conveniently used as an emulsion. It also finds suitable utility as a dispersing assistant for a dyeing agent since it has good dyeability with dyes or pigments. There have been attempts to produce reinforced plastics by incorporating glass fibers into polyolefins such as polyethylene and polypropylene, but such attempts have frequently failed because of poor adhesive strength between the polyolefins and the glass fibers. When the modified polyethylene wax obtained by this invention is added to the polyolefin, the adhesion between the polyolefin and the glass fibers can be markedly improved.

The polymerization wax modified with the unsaturated polycarboxylic acid obtained by the method of this invention can be subjected to any reaction in which carboxylic acids in general can participate. For example, it can be saponified by reaction with alkali. The modified wax further has good color, and is transparent. If it is reacted with a higher alcohol or amine, a half ester of half amide thereof can be readily formed. The modified polyethylene wax obtained by this invention is especially suitable for esterification by reaction with alcohol. Examples of the alcohol that can be used for the esterification reaction of the wax pretreated with the unsaturated polycarboxylic acid are alcohols having 1 to 22 carbon atoms such as monohydric alcohols, e.g. methyl alcohol, ethyl alcohol, propyl alcohol, butyl alcohol, hexyl alcohol, octyl alcohol, nonyl alcohol, decanol, undecanol, lauryl alcohol, myricyl alcohol or stearyl alcohol, or dihydric alcohols such as ethylene glycol, propylene glycol or butylene glycol, glycerol, or pentaerythritol.

The reaction between the wax modified with the unsaturated polycarboxylic acid and the alcohol is usually performed by reacting the wax in the presence or absence of a known esterification catalyst at a temperature of above the melting point of the wax but not higher than 200° C., preferably 150° to 190° C., after adding an alcohol so that the molar ratio of the carboxyl group and the hydroxyl group of the alcohol calculated from the acid value of the wax is 0.1 to 10. The amount of the alcohol is usually 0.1 to 10 mols per mol of the carboxylic acid-modified wax having an acid value of 1 to 150. Water formed as a result of the reaction is removed out of the reaction system, for example by blowing a nitrogen gas into the reaction system. Exaples of the esterification catalyst are paratoluenesulfonic acid, paratoluenesulfonyl chloride, ethyl titanate, propyl titanate, butyl titanate or titanium tetrachloride. The amount of the catalyst is usually from 0.01 to 5% by weight of the wax. Progress of the reaction may be determined by tracing the acid value, and usually the reaction ends within one to 10 hours.

The reaction mixture optionally may be purified by removing unreacted alcohol by a known method such as solvent extraction.

Before or after the modification with the unsaturated polycarboxylic acid, the waxy ethylene polymer may be oxidized by contacting it in the molten state with oxygen or a gas containing oxygen.

The oxidation is performed by blowing oxygen or a gas containing oxygen at atmospheric or elevated pressure, and at a temperature of above the melting point of the waxy ethylene polymer but not higher than 200° C., into a liquid phase containing the waxy ethylene polymer. The amount of oxygen or a gas containing oxygen may for instance be 0.03 to 3 m$^3$/hr.kg (wax) in the standard state if air is used.

The end point of the oxidation reaction is one at which the acid value of the treated wax increases by 0.3 to 3 from that of the wax before treatment. If the acid value increases too much, gellation occurs, and the reaction system becomes very highly viscous, in which case the operation cannot be continued and the color of the wax becomes poor. The oxidation reaction is carried out in the absence of a solvent while the reaction system is in the flowable state. Usually, the temperature to be employed for the oxidation reaction is at least the melting point of the starting wax and up to 140° C. The pressure may be normal atmospheric pressure but since it is desirable to finish the reaction within the shortest possible time, the use of elevated pressures is desirable for increasing the oxygen content of the liquid phase.

The most important point in this oxidation is to control the amount of combined oxygen (amount of oxygen absorption). The control of the amount of absorption of oxygen is carried out by collecting the sample wax at suitable times and determining the amount of combined oxygen.

The amount of oxygen required for the object of this invention is 0.1 to 3%, preferably 0.5 to 2%, based on the weight of the starting wax. If oxygen is absorbed in an amount more than necessary, the color of the modified wax as a final product becomes poor, and the viscosity of the reaction system rises, making it impossible to continue the operation, and at times, the system is gelled.

The oxidation treatment is preferably performed prior to the modification of the wax with the unsaturated polycarboxylic acid. The oxidation is usually carried out at 140° to 180° C.

The wax obtained by the oxidation treatment and modification with the unsaturated polycarboxylic acid in accordance with this invention has good stability in an aqueous medium containing divalent metal ions. The emulsion obtained imparts soil resistance to fibers treated therewith, and improves the washability of soils attached to fibers, thus providing a very excellent fiber treating agent. Similarly, the wax emulsion exhibits the same effects as the fiber treating agent in the processing of paper containing a cellulose component. The wax obtained by the method of this invention has a wide range of utility including an aqueous dispersing agent for dyes or pigments, a coating primer, a water-proofing agent for cement or concrete, and a lustering wax for floors, furniture or automobiles.

The modified wax obtained by the method of this invention can be emulsified by any known method. For example, at a temperature above the melting point of the modified wax, a suitable amount of the carboxyl group contained in the wax is neutralized with alkali, and the wax is then mixed with a surface active agent. The resulting mixture in the molten state is poured into hot water with stirring at atmospheric or elevated pressure, or hot water is poured into the resulting mixture at an elevated pressure to form an aqueous emulsion. The final product is obtained by rapidly cooling the emulsion.

The storage stability and chemical stability of the emulsion are tested by the following methods.

Into a test tube having an inner diameter of 10 mm is placed 1 cc of the emulsion to be tested, and for measurement of storage stability, the emulsion is diluted with distilled water to 10 times the original volume. The diluted emulsion is allowed to stand for 5 days at 23° C. to observe the state of separation. The storage stability can be conveniently evaluated within a short period by diluting it with water. For measurement of chemical stability, 1 cc of each of a 10% aqueous solution of NaCl, $Zn(NO_3)_2$, $MgSO_4$ and $CaCl_2$ is added to the 10 cc emulsion placed in the test tube, and the mixed solution is stirred well. The mixed solution is then allowed to stand at 23° C. for 24 hours, and the presence or absence of separation is determined and expressed as chemical stability to the respective metal ions.

The anti-creasing finish of a cloth of a blend of cotton and man-made fibers or a sewn product thereof can be formed by using the modified polyethylene wax obtained by this invention, in accordance with a customary method.

As examples of a cross-linking resin for cellulose, there can be cited urea and urea derivatives such as dimethylolurea, dimethylolated ethyleneurea, dimethylol propyleneurea, dimethoxyethyleneurea, dimethoxydihydroxyethyleneurea, melamine, melamine derivatives such as trimethylol melamine, dimethylol alkyl carbamates, diglycolic dihydrazide, methylol derivatives of diacetyl hydrazine, and diepoxy compounds such as glycerine diglycidyl ether, or dimethylol triazone.

The resins are used either alone or in admixture in the form of an aqueous solution having a resin concentration of 1 to 10% based on the cellulosic fibers. This resin solution is mixed with 3 to 30% by weight, based on the resin content, of the modified wax according to this invention and 1 to 10% by weight, based on the resin content, of a reaction promotor, to form a resin finish solution. Since an emulsion of the modified wax of this invention imparts far superior anti-soiling property to fibers as compared with the conventional wax emulsions, S-R finish agents are not particularly necessary. But the effect of imparting anti-soiling properties will become more remarkable if a commercially available S-R finish agent is added to the wax emulsion. In order to impart suppleness to the treated cloth, a suppleness-imparting agent, such as cationic surface active agents of the pyridinium type, silicone type softeners, alkyl ketene dimer type softeners, higher alkyl ethylene ureas, etc. may be added in a suitable amount.

The present invention will be described further by the following Examples and Comparative Examples.

EXAMPLE 1

Catalyst preparation 1000 g of commerically available anhydrous magnesium chloride (particle size 10 mesh sieve passed; specific surface area 4 m$^2$/g) and 100 g of titanium tetrachloride were pulverized for 48 hours in a stainless steel ball mill to form a solid catalyst component. This catalyst component carried titanium in an amount of 22 mg per gram.

Polymerization

The following ingredients were fed into a pressure polymerization vessel.

| | |
|---|---|
| The solid catalyst component (as a slurry in hexane) | 0.5 mM (calculated as Ti)/hr. |
| Triethyl aluminum | 2 mM/hr. |
| Hexane | 80 liters/hr. |
| Ethylene | 15 Kg/hr. |
| H$_2$ | 3 (molar ratio to ethylene in vapor phase)/hr. |

The polymerization was conducted at 180° C. and a total pressure of about 40 atms. The average residence time of the catalyst was 40 minutes. After separating the volatile matter from the resulting product, there was obtained 14.0 kg/hr. of straight chain polyethylene wax having a molecular weight of 2200, a density of 0.970, a melt viscosity of 47 centipoises (170° C.), and 0.50 intramolecular double bond per 1000 carbon atoms.

Modification of wax 150 g of the straight chain polyethylene wax was put into a 300 cc glass vessel equipped with a stirring rod and heat-melted from outside by an oil bath. At 150° C., nitrogen gas was blown from the bottom of the vessel at a rate of about 40 liters/hr. for 30 minutes to replace the atmosphere of the inside of the vessel by nitrogen gas. Then, 25 g of maleic anhydride and 5 g of benzoyl peroxide were successively put into the vessel, and the reaction was performed for one hour at 150° C. After the reaction, the reaction product was maintained at 5 mmHg for one hour with stirring thereby to remove volatile components such as unreacted maleic acid and peroxide decomposition product. The product was then transferred into a porcelain dish and solidified. The product was a slightly yellow solid having a Gardner number of 2 and an acid value, after acetone extraction, of 63. Furthermore, it had a melt viscosity of 53 centipoises (170° C.) and was free from a gelled product.

Comparative Example 1

150 g of polyethylene wax having a weight average molecular weight of 2000, a density of 0.960 and 1.14 intramolecular double bonds per 1000 carbon atoms, which had been prepared by heat degradation of straight-chain polyethylene (weight average molecular weight of 50000) was reacted in the same way as set forth in Example 1. The viscosity of the reaction mixture rose with the passage of time, and in three minutes, it was impossible to stir the mixture. This was considered to be due to the occurrence of cross-linking reaction by the intramolecular double bonds. The reaction product had an acid value of 6.3 after extraction with acetone.

EXAMPLE 2

Catalyst preparation

One kilogram of magnesium oxide which was dried and had an average particle diameter of one micron (weight average measured by the precipitation method) was suspended in 20 liters of titanium tetrachloride containing 10 liters of VCl$_4$, and stirred for 2 hours at 135° C., followed by washing with hexane and drying. The resulting solid catalyst component carried 8 mg of Ti, 9 mg of V and 160 mg of Cl per gram thereof.

Polymerization

The following ingredients were continuously fed into a pressure polymerization vessel in the amounts indicated.

| | |
|---|---|
| Solid catalyst component | 0.2 mM (calculated as Ti)/hr. |
| Triethyl aluminum | 1.0 mM/hr. |
| Hexane | 100 liters/hr. |
| Ethylene | 20 Kg/hr. |
| Propylene | 0.33 (molar ratio to ethylene in vapor phase in the vessel)/hr. |
| H$_2$ | 0.3 (molar ratio to ethylene in vapor phase in the vessel)/hr. |

The polymerization was performed at 170° C. and a total pressure of about 40 atms. The average residence time of the catalyst was 30 minutes. There was obtained 19.7 kg/hr. of polyethylene wax having a molecular weight of 6900, a density of 0.930, a melt viscosity of 8500 centipoises and 0.26 intramolecular double bond per 1000 carbon atoms.

Modification of the wax

A reactor was charged with 100 g of the resulting polyethylene wax and 100 ml. of perchloroethylene, and heated to dissolve the wax. After purging with nitrogen, 2 g of maleic anhydride and 0.2 g of ditertiary butyl peroxide were added. The reaction mixture was reacted for 2 hours under reflux. After the reaction, the product was stirred well in one liter of acetone, recrystallized, and dried to obtain a white powder. The product had a Gardner number of 1, a melt viscosity of 9300 centipoises and an acid value, after extraction with acetone, of 16.

EXAMPLE 3

Ethylene was copolymerized with propylene at 170° C. using the catalyst obtained in Example 1 to obtain polyethylene wax having a molecular weight of 2000, a melt viscosity of 42 centipoises at 170° C., a density of 0.981 and 0.38 intramolecular double bond per 1000 carbon atoms. 150 g of the resulting polyethylene wax was reacted with 6 g of maleic anhydride in the presence of 3 g of tertiary butyl cumylperoxide at 160° C. for 4 hours using the same reactor as used in Example 1. After the reaction, the product was maintained for one hour at 5 mmHg with stirring to remove volatile components such as unreacted maleic anhydride or peroxide decomposition products. The product was then transferred into a porcelain dish, and solidified. There was obtained a slightly yellow solid having a Gardner number of 1, an acid value, after acetone extraction, of 35 and a melt viscosity at 170° C. of 46 centipoises. The viscosity was raised only slightly by the grafting of the maleic anhydride.

EXAMPLE 4

150 g of polyethylene wax obtained by copolymerizing ethylene and 1-butene and having a molecular weight of 3600, a density of 0.942, 0.32 intramolecular double bonds per 1000 carbon atoms and a melt viscosity of 300 centipoises at 170° C. were reacted with 15 g of 5-bicyclo [2.2.1] heptene-2,3-dicarboxylic anhydride in the presence of 0.15 g of benzoyl peroxide in the same way as in Example 1 at 130° C. for 3 hours. The volatile components present in the product were removed by maintaining it at 5 mmHg for one hour. The product was then transferred into a porcelain dish and solidified. The resulting product was a slightly yellow solid having a Gardner number of 1, an acid value, after acetone extraction, of 12 and a melt viscosity of 410 centipoises.

EXAMPLE 5

Catalyst preparation

Commercially available magnesium chloride anhydride was calcined at 600° C. for 3 hours in a stream of nitrogen, and then suspended in dehydrated hexane in an atmosphere of nitrogen. With stirring at high speed, a stoichiometric amount of anhydrous ethanol was added to prepare a carrier having the composition $MgCl_2 \cdot 6C_2H_5OH$. The carrier obtained was suspended in liquid titanium tetrachloride, and the liquid was stirred for 1.5 hours at 110° C. The suspension was then filtered while hot, and the precipitate was washed with refined hexane until no chlorine was recognized in the wash liquid, followed by drying. The solid catalyst component obtained carried 62 mg Ti (calculated as metal) per gram thereof.

Polymerization

A 200 liter stainless steel polymerization vessel equipped with a good stirrer was charged continuously with the following ingredients.

| Solid catalyst component | 0.2 mM (calculated as Ti)/hr. |
|---|---|
| Triethyl aluminum | 1 mM/hr. |
| Hexane | 50 liters/hr. |
| Ethylene | 20 Kg/hr. |
| $H_2$ | 3.5 (molar ratio to ethylene in vapor phase in the polymerization vessel)/hr. |

The polymerization was continuously performed at 180° C. ana a total pressure of about 45 atms. The average residence time of the catalyst was 2 hours. There was obtained 18.6 kg/hr. of a polyethylene wax having a viscosity average molecular weight of 2000, a density of 0.973, and 0.32 unsaturated bond per 1000 carbon atoms.

Modification of the wax

60 Kg of the resulting wax was heated to 140° C., followed by addition of 12 Kg of maleic anhydride, and then 6 Kg of benzoyl peroxide over 60 minutes by a metering pump. The reaction was continued for 5 hours at 140° C. The volatile components were removed from the reaction mixture by maintaining it at 50 mmHg for 3 hours. The resulting product had an acid value of 56. The reaction temperature was then raised to 160° C., and then 22 Kg of alcohol containing at least 95% of stearyl alcohol and having a hydroxyl value of 200 was charged. Nitrogen was fed at a rate of 1 m³/hr. and 0.6 Kg of paratoluenesulfonic acid was further added. The reaction was performed for 5 hours at 160° C. Thereafter, the reaction mixture was maintained at 50 mmHg for 2 hours to remove the volatile components.

The resulting modified wax had a saponification value of 43, an acid value of 4, a hydroxyl value of 12, a Gardner number of 5, an average molecular weight of 2800 and a density of 0.980.

EXAMPLE 6

Catalyst preparation

One kilogram of magnesium oxide which was dried and had an average particle diameter of one micron (weight average measured by the precipitating method) was suspended in 10 liters of titanium tetrachloride, and the suspension was stirred for 2 hours at 135° C. The precipitate was separated, and washed with hexane, followed by drying. The solid component carried 8 mg of Ti per gram thereof, after drying.

Polymerization

The following ingredients were continuously charged into a pressure polymerization vessel in the amounts indicated.

| Solid catalyst component | 0.2 mM (calculated as Ti)/hr. |
|---|---|
| Triethyl aluminum | 8 mM/hr. |
| Hexane | 90 liters/hr. |
| Ethylene | 20 kg/hr. |
| Propylene | 0.13 (molar ratio to ethylene in the vapor phase of polymerization vessel)/hr. |
| $H_2$ | 4 (molar ratio to ethylene in the vapor phase of polymerization vessel)/hr. |

The polymerization of ethylene was conducted at 170° C. and a total pressure of about 45 atms. The average residence time of the catalyst was one hour.

There was obtained 19.2 kg/hr. of a polypropylene wax having a viscosity average molecular weight of 1500, a density of 0.94, and 0.4 unsaturated bond per 1000 carbon atoms.

Modification of the wax

1 Kg of the wax obtained was heated to 150° C. to melt it, and with stirring reacted with air at a rate of 50 liters per hour for a period of 1.5 hours. The oxygen was bonded to the wax in an amount of 0.70% by weight. The oxidized wax was heated to 180° C. and nitrogen gas was blown at a rate of 100 liters/hr. for one hour to purge the reactor with nitrogen gas. Then, 20% by weight of maleic anhydride and 1.0% by weight of dicumyl peroxide were added, and reacted with the oxidized wax for 4 hours. 100 g of the resulting product was dissolved by heating in 600 ml. of xylene, and the solution was gradually poured into 6 liters of cold acetone to precipitate the product. The resulting solid product was dried at reduced pressure at 70° C. for 15 hours. The resulting product was modified wax having an acid value of 53. The dilution stability, chemical stability, and anti-soiling property of the resin-finished cloth, and the wash features of the resulting modified wax were measured, and the results are shown in Table 1.

Comparative Example 2

The wax obtained by the method described in Example 6 was melted at 150° C., and reacted with air at a rate of 100 liters/hr. for 8 hours. There was obtained an oxidized way to which 6.4% by weight of oxygen was bonded and which had an acid value of 31.

The dilution stability, chemical stability, and the anti-soiling property of the resin finished cloth, and the the wash fastness of the resulting oxidized wax (not reacted with an unsaturated carboxylic acid and a peroxide) were measured and the results are shown in Table 1. It is observed that the oxidized wax obtained by this Example was inferior in anti-soiling property.

Comparative Example 3

The wax obtained by the method described in Example 6 was melted at 150° C. and contacted with air at a rate of 50 liters/hr. for 0.2 hour to form an oxidized wax having 0.06% by weight of combined oxygen. The resulting wax was reacted with maleic anhydride and dicumylperoxide in the same way as set forth in Example 6 to form a modified wax having an acid value of 50. The properties of the modified wax are shown in Table 1. The wax was inferior in chemical stability.

Comparative Example 4

The wax obtained in Example 6 was melted at 150° C., and reacted with air at a rate of 50 liters/hr. for 13 hours to form an oxidized wax containing 4.2% by weight of combined oxygen. The resulting oxidized wax was reacted with maleic anhydride and dicumyl peroxide in the same way as set forth in Example 6. Gellation occurred during the reaction, and the viscosity of the reaction mixture became high, making it impossible to continue the reaction.

Comparative Example 5

The oxidized wax obtained in Example 6 was modified except that dicumyl peroxide was not used. The modified wax obtained had an acid value of 7, and was inferior in dilution of stability and chemical stability. The properties of the modified wax are shown in Table 1.

EXAMPLE 7

The oxidized wax obtained in Example 6 was reacted with maleic acid and dicumyl peroxide under the conditions shown in Table 1 to form a modified wax having an acid value of 26. The properties of the resulting modified wax are shown in Table 1.

EXAMPLE 8

The oxidized wax obtained in Example 6 was reacted with monoethyl maleate and dicumyl peroxide to form a modified wax having an acid value of 23. The properties of the resulting modified wax are shown in Table 1.

EXAMPLE 9

The oxidized wax obtained in Example 6 was reacted with 5-bicyclo [2.2.1] heptene-2,3-dicarboxylic anhydride and di-tertiary butyl peroxide to form a modified wax having an acid value of 40. The properties of the resulting wax are shown in Table 1.

Table 1

| Examples or Comparative Examples | Wax oxidation Conditions | | | Amount of combined oxygen in oxidized wax (wt. %) | Graft-reacting conditions | | | |
|---|---|---|---|---|---|---|---|---|
| | Temperature (° C) | Amount of air (liters per hour) | Reaction time (hours) | | Unsaturated polycarboxylic acid (wt. %) | Peroxide (wt. %) | Temperature (° C.) | Reaction time (hours) |
| Ex. 6 | 150 | 50 | 1.5 | 0.70 | maleic anhydride (7.0) | dicumyl peroxide (1.0) | 180 | 4 |
| Comp. 2 | 150 | 100 | 8.0 | 6.4 | — | — | — | — |
| Comp. 3 | 150 | 50 | 0.2 | 0.06 | maleic anhydride (7.0) | dicumyl peroxide (1.0) | 180 | 4 |
| Comp. 4 | 150 | 50 | 13 | 4.2 | maleic anhydride (7.0) | dicumyl peroxide (1.0) | 180 | 4 |
| Comp. 5 | 150 | 50 | 1.5 | 0.70 | maleic anhydride (7.0) | — | 180 | 4 |
| Ex. 7 | 150 | 50 | 1.5 | 0.70 | maleic acid (15) | dicumyl peroxide (2.0) | 180 | 4 |
| Ex. 8 | 150 | 50 | 1.5 | 0.70 | monoethyl maleate (15) | dicumyl peroxide (2.0) | 180 | 4 |
| Ex. 9 | 150 | 50 | 1.5 | 0.70 | 5-bicyclo $6^2$ anhydride (10) | di-t.butyl peroxide (2.0) | 180 | 4 |

| Examples or Comparative Examples | Acid values | Properties of the modified wax | | | | | Resin-finished cloth | |
|---|---|---|---|---|---|---|---|---|
| | | Dilution stability | Chemical stability | | | | Anti-soiling property | Wash fastness |
| | | | Na+ | Mg++ | Zn++ | Ca++ | | |
| Ex. 6 | 53 | good | O | O | O | O | excellent | good |
| Comp. 2 | 31 | good | O | O | O | O | poor | slightly good |
| Comp. 3 | 50 | slightly good | O | X | X | X | good | good |
| Comp. 4 | — | — | — | — | — | — | — | — |
| Comp. 5 | 7 | poor | X | X | X | X | — | — |
| Ex. 7 | 26 | good | O | O | O | O | good | excellent |
| Ex. 8 | 23 | good | O | O | O | O | good | excellent |
| Ex. 9 | 40 | good | O | O | O | O | excellent | excellent |

O = absence of separation
X = presence of sepration.

EXAMPLE 10

Catalyst preparation

Commercially available magnesium chloride anhydride (1000 g, 100-mesh sieve passed; specific surface area 4 m²/g) and 100 g of titanium tetrachloride were copulverized in a stainless ball mill at room temperature for 48 hours to otain a solid catalyst component. The catalyst component obtained carried 22 mg of Ti per gram thereof. The catalyst component was used as a hexane slurry at the time of polymerization.

Polymerization

A pressure polymerization vessel was charged continuously with the following ingredients, and the polymerization was performed at 190° C. and a total pressure of about 50 atms. The average residence time of the catalyst was one hour.

| Solid catalyst component | 6 mM (calculated as Ti)/hr. |
|---|---|
| Triisobutyl aluminum | 12 mM/hr. |
| Hexane | 90 liters/hr. |
| Ethylene | 20 Kg/hr. |
| H$_2$ | 20 (the molar ratio to ethylene in the vapor phase of polymerization vessel)/hr. |

There was obtained 15.0 kg of a polyethylene wax having a viscosity average molecular weight of 700, a density of 0.94 and 0.4 unsaturated bond per 1000 carbon atoms.

MODIFICATION OF THE WAX

1 Kg of the resulting wax was melted at 150° C., and reacted with air at a rate of 50 liters/hr. for 3 hours. There was obtained an oxidized wax having 2.5% by weight of combined oxygen.

The resulting oxidized wax was reacted with 7.0% by weight of maleic anhydride and 0.2% by weight of t-butyl hydroperoxide with stirring for 4 hours. After the reaction, the reaction product mixture was maintained at 5 mmHg for one hour with stirring to remove volatile components such as unreacted maleic anhydride or peroxide decomposition products. The resulting modified wax had an acid value of 20. The dilution stability, chemical stability, anti-soiling property and wash fastness of the resulting modified wax are shown in Table 2.

EXAMPLE 11

Using the solid catalyst component prepared in Example 6, the following compounds were continuously charged into a polymerization vessel, and the polymerization was carried out at 170° C. and a total pressure of about 40 atms. The average residence time of the catalyst was 1 hour.

| Solid catalyst component | 0.2 mM/hr. |
|---|---|
| Triethyl aluminum | 8 mM |
| Hexane | 90 liters/hr. |
| Ethylene | 20 Kg/hr. |
| Butene-1 | 0.07 (molar ratio to ethylene in the vapor phase of polymerization vessel)/hr. |
| H$_2$ | 3 (molar ratio to ethylene in the vapor phase of polymerization vessel)/hr. |

As the result of the polymerization, there was obtained 18.8 Kg/hr. of a wax having a viscosity average molecular weight of 3200 and a density of 0.92.

MODIFICATION OF THE WAX

1 Kg of the resulting wax was melted at 150° C., and 5.0% by weight of maleic anhydride and 0.8% by weight of t-butyl peroxylaurate were reacted with the wax for 4 hours. After the reaction, the product was dissolved in xylene by heating. Then, the solution was gradually added to cold acetone to precipitate the product which was then filtered and dried. The resulting modified wax was melted at 170° C. and reacted for 3 hours with oxygen by blowing air at a rate of 200 liters/hr. There was obtained an oxidized wax containing 0.37% by weight of oxygen. The modified wax had an acid value of 43, and the various properties of it are shown in Table 2.

EXAMPLE 12

Polymerization

Using the solid catalyst component obtained in Example 5, a 200-liter stainless steel polymerization vessel equipped with a stirrer was charged with the following ingredients, and the polymerization was carried out at 180° C. and a total pressure of about 50 atms. The average residence time of the catalyst was 2 hours.

| Solid catalyst component | 0.2 mM/hr. |
|---|---|
| Triethyl aluminum | 1 mM/hr. |
| Hexane | 50 liters/hr. |
| Ethylene | 20 kg/hr. |
| H$_2$ | 3.5 (molar ratio to ethylene in the vapor phase of polymerization vessel)/hr. |

There was obtained 17.5 kg/hr. of polyethylene wax having a viscosity average molecular weight of 2000 and a density of 0.97.

MODIFICATION OF THE WAX

1 Kg of the resulting wax was melted at 160° C., and reacted with oxygen by blowing air at a rate of 50 liters/hr, for 3.5 hours. There was obtained an oxidized wax having 0.82% by weight of combined oxygen. After the oxidation, nitrogen was blown into the vessel at a rate of 100 liters/hr. for 30 minutes, and subsequently, 8.0% by weight of maleic anhydride and 1.0% by weight of ditertiary butyl peroxide were reacted with the wax for 2 hours. After the reaction, the reaction product mixture was maintained at 5 mmHg for one hour to remove volatile components such as unreacted maleic anhydride and peroxide decomposition products. The resulting modified wax had an acid value of 76, and the various properties of the modified wax were measured and shown in Table 2.

EXAMPLE 13

CATALYST PREPARATION

One kilogram of magnesium hydroxide was dried at 150° C., and then suspended in a mixture of 10 liters of titanium tetrachloride and 10 liters of vanadium oxychloride, and the reaction was performed at 130° C. for 2 hours with stirring. The resulting solid catalyst component carried 13 mg of Ti and 16 mg of V per gram thereof.

Polymerization

A pressure polymerization vessel was charged with the following ingredients continuously, and the polymerization was carried out continuously at 160° C. and a total pressure of about 40 atms. The average residence time of the catalyst was 2 hours.

| Solid catalyst component | 0,2 mM (calculated as Ti - Vi)/hr. |
|---|---|
| Triethyl aluminum | 1mM/hr. |
| Hexane | 50 liters/hr. |
| Ethylene | 20 kg/hr. |
| Propylene | 0.3 (molar ratio to ethylene in the vapor phase in the vessel)/Hr. |
| $H_2$ | 3 (molar ratio to ethylene in the vapor phase in the vessel)/hr. |

There was obtained 18.5 kg/hr. of a wax having a viscosity average molecular weight of 2000 and a density of 0.94.

MODIFICATION OF THE WAX

1 Kg of the resulting wax was melted at 160° C. and reacted for 2 hours with 6.5% by weight of maleic anhydride and 1.0% by weight of ditertiary butyl peroxide. After the reaction, the reaction product mixture was maintained at 5 mmHg for one hour to remove volatile components. The temperature was raised to 170° C., and a rate of 50 liters/hr. air was blown into the reactor. The reaction was performed for one hour to form an oxidized wax containing 1.25% by weight of combined oxygen. The resulting oxidized wax had an acid value of 45, and the properties of the modified wax were measured and shown in Table 2.

TABLE 2

| Example Nos. | Dilution stability | Chemical stability | | | | Resin-finished cloth | |
|---|---|---|---|---|---|---|---|
| | | Na+ | Mg++ | Zn++ | Ca++ | Anti-soiling property | Wash fastness |
| 10 | good | O | O | O | O | good | excellent |
| 11 | good | O | O | O | O | excellent | excellent |
| 12 | good | O | O | O | O | excellent | good |
| 13 | good | O | O | O | O | excellent | good |

O = absence of separation
X = presence of separation.

What is claimed is:

1. A variation of a method of producing a modified waxy ethylene polymer comprising
   A. polymerizing ethylene in an inert hydrocarbon solvent and in the presence of at least one member of the group consisting of hydrogen and an alpha olefin:
      1. at a temperature of 120° to 250° C.;
      2. at a pressure ranging from the vapor pressure of the solvent at the polymerization temperature to 100 Kg/cm²; and
      3. using a catalyst composed of an organoaluminum compound together with a halogen compound of at least one of the group consisting of titanium and vanadium, said halogen compound being supported on a carrier comprising a hydrocarbon-insoluble magnesium-containing compound; to form a waxy ethylene polymer having a viscosity average molecular weight of 500 to 30,000, as determined from measuring the inherent viscosity in a decalin solution at 135° C., and having a density of 0.900 to 0.975 g/cm³,
   B. reacting one of the group consisting of maleic, fumaric, citraconic, itaconic or himic acids, their anhydrides, or their esters, with the resulting waxy ethylene polymer in the presence of one of the group consisting of dialkyl peroxides, diacyl peroxides, and peroxy esters, present in an amount of from 0.01 to 20 parts by weight per 100 parts by weight of the polyethylene wax and at a temperature from the melting point of the waxy ethylene polymer to 250° C., to form a modified waxy ethylene polymer,
   C. wherein the waxy ethylene polymer or modified waxy ethylene polymer is contacted with oxygen at a temperature of from its melting point to 200° C., so that the polymer being oxidized absorbs from 0.1 to 3% of its own weight of oxygen and so that its acid value is increased from 0.3 to 3.0.

2. The method of claim 1 in which the waxy ethylene polymer is contacted with oxygen.

3. The method of claim 1 in which the modified waxy ethylene polymer is contacted with oxygen.

4. The method of claim 2 in which the unsaturated polycarboxylic acid is maleic anhydride.

5. The method of claim 3 in which the unsaturated polycarboxylic acid is maleic anhydride.

6. The method of claim 2 in which unsaturated polycarboxylic acid is anhydride.

7. The method of claim 3 in which the unsaturated polycarboxylic acid is 5-bicyclo [2.2.1] heptene-2,3-dicarboxylic anhydride.

* * * * *

UNITED STATES PATENT OFFICE
CERTIFICATE OF CORRECTION

Patent No. 4,039,560        Dated August 2, 1977

Inventor(s) TORU TOMOSHIGE

It is certified that error appears in the above-identified patent and that said Letters Patent are hereby corrected as shown below:

Claim 6, line 2, after "is", insert -- 5-bicyclo[2.2.1]heptene-2,3-dicarboxylic --

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*